UNITED STATES PATENT OFFICE.

LOUIS PETIT DEVAUCELLE, OF COURBEVOIE, FRANCE, AND FELICE BENSA, OF GENOA, ITALY.

PROCESS OF MANUFACTURE OF CYANIDS AND AMMONIA.

1,237,485.	Specification of Letters Patent.	Patented Aug. 21, 1917.

No Drawing.	Application filed September 9, 1915.   Serial No. 49,825.

*To all whom it may concern:*

Be it known that we, LOUIS PETIT DEVAUCELLE, a citizen of the French Republic, residing at No. 184 Rue de Bécon, in Courbevoie, Seine, in France, and FELICE BENSA, a subject of the King of Italy, residing at No. 25 Piazza Fontane Marose, in Genoa, in Italy, have made certain new and useful Improvements in the Process of Manufacture of Cyanids and Ammonia, of which the following is a specification.

This invention has for its object to provide an improved process for the manufacture of cyanids and ammonia and its salts. This improved process is based on the reactions employed in the Margueritte and Sourdeval processes, but it has the following very important advantages over known processes, namely:

(1.) The improved process allows of regenerating indefinitely the oxids of the alkali metals or earthy alkali metals that are employed for the manufacture of cyanids and ammonia.

(2.) The improved process produces a much higher yield of cyanids and ammonia than that obtained hitherto.

(3.) All the reactions employed in the improved process take place at temperatures that are much lower than the temperature thought to be indispensable hitherto. These relatively low temperatures have the result that the improved process can be worked with very little or no wear and tear of the apparatus, and with a great saving in fuel.

(4.) In the improved process the two stages of manufacture (cyanization and decyanization) is effected by means of steam at different temperatures without having to transfer the reaction mass from one apparatus to another, because the furnaces or apparatus remain at the constant temperature required for the cyanization.

(5.) In the improved process there is a complete regeneration of the tars or pitches, benzols, and oils produced by the pyrogenous decomposition of tars or pitches.

According to this invention the impure carbonates or oxids employed in the Margueritte and Sourdeval processes are replaced in the improved process by salts or oxids of alkali metals or earthy alkali metals produced by precipitation, that is to say, in the pure or almost pure state, and the carbonaceous materials (wood charcoal, coal, coke, etc.) employed in those known processes are replaced in the improved process by carbon or coke of the greatest possible purity. Now carbon is readily obtainable which contains only 0.05 of ash and which is quite suitable for the purposes of this invention. Such carbon are the various kinds of coke produced in the distillation of petroleum, tar, shale oils, retort carbon, Scotch anthracite and Welsh anthracite, anthracite from the districts of Rolduc, Vizille and Mayenne, and bituminous coal.

To the mixture of carbon and the oxid or salt of the alkali metal or alkaline earth metal (for example carbonate of barium) there is added about 20 per cent. of tar, pitch or any other agglomerant (tar gives the best results). The mixture is then agglomerated in any shape. It has been found that if the mixture of barium, carbon and tar is stirred in any apparatus, a very large quantity of tar is required and the agglomeration is badly done. If on the contrary a mixture of about 20 parts of tar and 100 parts of the mixture of for instance carbonate of barium, and carbon, is ground under stones, the result will be a perfect agglomerate, which will give the best results.

*Manufacture of cyanid.*—Cyanid is made by heating the agglomerated materials in a suitable furnace, preferably a furnace with vertical, inclined or horizontal retorts. The said furnace is provided like a gas furnace with the usual drums and apparatus for the purpose of recovering the by-products.

The operation of the cyanization is effected as follows:

When the agglomerated mass has been charged into the retorts, there takes place at first a distillation of the tars, pitches or agglomerants that have been employed, as well as a partial pyrogenous decomposition of said agglomerants. A certain amount of carbon becomes fixed, and the remainder of the agglomerant volatilizes and is recovered in the drums and other devices for that purpose, either in the liquid or in the gaseous state.

When the agglomerated mass has acquired the requisite temperature for cyanization, say, 1050 degrees C., nitrogen of the greatest possible purity is injected into the retorts. This nitrogen may be cold, but it is preferred to heat it in a heater similar to the Cowper, Whitwell or other stoves or heaters employed in metallurgy. The nitrogen may be produced by any industrial process, but the yield of cyanid and subsequently, of ammonia, is practically proportionate to the purity of the nitrogen.

*Manufacture of ammonia.*—When it is judged that the cyanid has formed, the temperature of the furnace is allowed to fall to a degree sufficient to prevent the formation of cyanate and yet prevent the subsequently formed ammonia from becoming dissociated. Steam or water vapor is then injected into the mass, whereby ammonia is formed in accordance with the following reaction:

$$MCN + 2H_2O = MOH + CO + NH_3$$

(It is to be noted that the produced ammonia represents the whole of the nitrogen contained in the cyanid).

Instead of lowering the temperature of the furnace, the cyanid may be removed from the latter and be treated in a separate apparatus.

We have discovered that if a large volume of steam be injected with a certain velocity into a mass of relatively good heat conductivity inclosed in an externally heated retort as is the case in gas-making plant, the mass will cool more quickly than the retort. Consequently by this means and without lowering the temperature of the furnace and the retorts, a fall of temperature can be produced which may be utilized for decomposing the cyanid by means of water vapor as above stated, without any risk of causing either the dissociation of the ammonia or the formation of cyanate. The advantage of operating thus is very great. In fact, this way of operating avoids completely the removal of the cyanid from the furnace in which it has been formed, as well as the dangers and losses which might attend such removal in free air. Moreover a great amount of fuel is saved by the fact that the reaction mass only is cooled instead of cooling the entire furnace as well.

The ammonia formed in this reaction is collected by any suitable known industrial devices, and it may be converted into any desired salt of ammonia.

The agglomerant is recovered in part and is employed for other operations.

The combustible gases which are collected in the drums and other apparatus, and which are derived from the decomposition of the agglomerants and as the result of the reactions, are utilized for heating the furnaces and similar apparatus.

What we claim is:—

1. A process for the manufacture of ammonia from cyanid which comprises charging a suitable reaction mass into a retort, passing nitrogen therethrough to effect cyanization and without removing the mass from the retort, passing a current of steam through the reaction mass and thereby cooling the mass to the desired temperature, without appreciably cooling the furnace and retort, and at the same time forming ammonia.

2. A process for the manufacture of ammonia from cyanid which comprises charging a suitable reaction mass into a retort, passing nitrogen therethrough to effect cyanization, and without removing the mass from the retort, passing a current of steam through the reaction mass and thereby cooling the mass sufficiently to prevent the formation of cyanates and the dissociation of the ammonia formed, without appreciably lowering the temperature of the furnace and the retort, and at the same time forming ammonia.

In testimony whereof we have signed our names to this specification.

LOUIS PETIT DEVAUCELLE.
FELICE BENSA.